United States Patent Office 3,463,762
Patented Aug. 26, 1969

3,463,762
POLYURETHANES FROM FLUOROALKYL
PROPYLENEGLYCOL POLYETHERS
Floyd D. Trischler, San Diego, Calif., assignor to Whittaker Corporation, Los Angeles, Calif., a corporation of California
No Drawing. Filed Dec. 30, 1966, Ser. No. 606,036
Int. Cl. C08g 22/14
U.S. Cl. 260—77.5      11 Claims

ABSTRACT OF THE DISCLOSURE

This patent describes highly stable polyurethane polymers prepared by reacting a polyether having the formula:

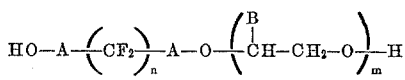

wherein A is an alkylene group, B is a fluorine-containing alkyl group, $n$ is an integer from 1 to about 10 and $m$ is an integer from 1 to about 200, with a diisocyanate having the formula:

OCN—A'—NCO wherein A' is a divalent organic group. Compounded stocks of these polymers may be shaped and cured in conventional equipment used in the rubber industry. The solutions are dispersed gels prepared from the polymers of this invention and may be used for forming supported or unsupported films for coating fabrics or solid surfaces, and for forming adhesive bonds between a wide variety of plastics, elastomers, fabrics, metals, wood, leather, ceramics and the like.

---

This invention relates to a novel class of fluorine-containing polyurethane polymers prepared by the reaction of diisocyanates with fluorine-containing hydroxy-terminated ethers.

In the printed literature there has been reference to the synthesis of urethane polymers based on hydroxy-containing ethers. However, these ethers and the previously reported polyurethane polymers based thereon do not possess any significant improvement in chemical and thermal stability over the other commercially available polyurethane polymers. In general, the ordinary polyurethanes do not possess a high degree of stability in the presence of chemicals, solvents, strong acids and oxidizing agents. In addition, the ordinary elastomeric polyurethanes are subject to degradation at elevated temperature unless there is added thereto a substantial amount of a stabilizer. Even in the situation where stabilizers are employed, the polyurethane does not always exihibit good properties at elevated temperature since many of the most readily available stabilizers tend to exude or otherwise fail at elevated temperatures. Accordingly, it can be seen that there has existed in the art a genuine need for a polyurethane polymer possessing a high degree of resistance to the effects of acid, strong oxidizing agents, chemicals, solvents and elevated temperatures. This, the present invention provides to a very significant degree, and hence involves a substantial advance in the state of the art.

Thus, it is a principal object of the present invention to provide a novel class of polyurethane polymers.

More particularly, it is an object of the present invention to provide a novel class of polyurethane polymers which are fluorine-containing and which are based upon hydroxy-terminated fluorine-containing ethers.

Even more specifically, it is an object of the present invention to provide a novel class of polyurethane polymers which are resistant to acids, alkali, solvents, chemicals and oxidizing agents, based upon fluorine-containing ethers and diisocyanates.

In another aspect of the present invention, it is an object thereof to provide a new method for the preparation of novel fluorine-containing polyurethanes.

These and other objects and advantages of the present invention will be apparent from the more detailed description which follows.

Briefly, the present invention comprises the novel polyurethanes having the following repeating unit:

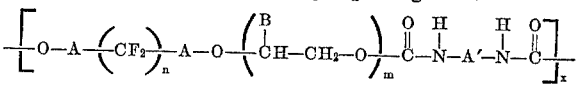

prepared by reacting a fluorine-containing hydroxy terminated polyether of the formula

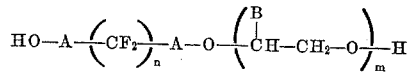

with a fluorine-containing diisocyanate of the formula

OCN—A'—NCO wherein in the above formulae A is an alkylene radical preferably containing 1 to about 5 carbon atoms such as methylene, ethylene, propylene, or butylene, B is a fluorine containing alkyl radical containing 1 to about 5 carbon atoms, A' is a divalent organic group such as, an aromatic hydrocarbon group, aliphatic hydrocarbon group, a halohydrocarbon group, or hetero-interrupted aromatic groups such as those having the formula

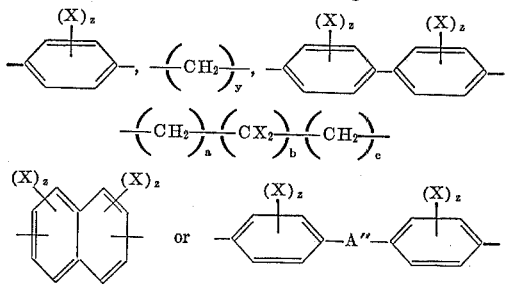

wherein A'' is oxygen, sulfur, imino, alkylene, or alkylated alkylene, the X is halogen, hydrogen, or alkyl, and $n$, $a$, $b$ and $c$ are integers from 1 to about 10, $m$ is an integer from 1 to about 200, $x$ is an integer from 1 to about 500, and $z$ is an integer from 1 to 4. Preferably A' is phenylene chlorophenylene, fluorophenylene, alkylated phenylene and the like. In general, A' contains from 2 to about 20 carbon atoms.

Typically, B is monofluoromethyl, perfluoromethyl, perfluorobutyl, and the like.

Preferably, the polyurethanes of the present invention are prepared by reacting a stoichiometric amount up to a stoichimetric excess of the diisocyanate with the hydroxy-containing polyethers. Where the diisocyanate is utilized in a stoichiometric excess, there results an isocyanate terminated polyurethane prepolymer. Such polymer may be cured or chain extended with an active hydrogen-containing compound such as a diol, triol, water, amine, or thiol. Accordingly, the present invention encompasses the discovery of such cross-linked and chain extended polyurethane polymers.

The following examples are presented solely to illustrate the invention and should not be regarded as limiting in any way. In the examples, the parts and percentages are by weight unless otherwise indicated.

EXAMPLE I

The hydroxy terminated poly(trifluoropropyleneglycol) mono(hydroxyhexafluoropentyl)ether having a molecular weight of 970 (8.0 g., 0.00825 mole) was added to tetrafluoro-p-phenylene diisocyanate (2.9 g., 0.0124 mole) at 60°–70° C. with mixing. The polymerization was carried out at 80°–90° C. for 165 minutes, then postcured at 165° C. for ½ hour. The film was exposed to moist air for 20 minutes, then postcured at 165° C. for ½ hour. The final polymer was a tough, clear elastic film capable of being used in coatings, laminates, adhesives, etc.

EXAMPLE II

The hydroxyl terminated poly(trifluoropropyleneglycol)mono(hydroxyhexafluoropentyl)ether having a molecular weight of 2150 (10.8 g., 0.005 mole) and tolylene-2.4-diisocyanate (1.1 g., 0.006 mole) were mixed at 80°–150° C. in a ½ hour period, followed by a postcure at 105° C. for 1½ hours to yield a highly elastomeric tough polymer.

This invention also includes the formation of prepolymers for use as coatings or adhesives. Isocyanate-terminated prepolymers can be prepared by using a greater than stoichiometric amount of diisocyanate. This prepolymer is subsequently advanced with active hydrogen containing compounds such as diamines, diols, dithiols, etc. Hydroxyl-terminated prepolymers can be prepared by using a greater than stoichiometric amount of diol. This prepolymer is subsequently advanced with additional diisocyanate.

The properties of these polymers may be varied by suitable compounding. The amount and type of compounding agent to be incorporated in the stock is dependent upon the use for which the polymer is intended. The compounding agents ordinarily used in the rubber industry with either natural or synthetic rubber are useful with the products of this invention. These include carbon black, clay, silica, talc, zinc, and magnesium oxides, calcium and magnesium carbonate, titanium dioxide, and plasticizers. Inorganic and organic coloring agents may be incorporated to give well defined colors. Conventional rubber processing machinery such as rubber mills or Werner-Pfleiderer or Banbury mixers may be used. The resulting compounded stocks may be shaped and cured in conventional equipment used in the rubber industry. The solutions or dispersed gels prepared from the polymers of this invention may be used for forming supported or unsupported films, for coating fabrics or solid surfaces, and for forming adhesive bonds between a wide variety of plastics, elastomers, fabrics, metals, wood, leather, ceramics and the like.

The hydroxy-terminated polyethers of this invention are obtained in accordance with the teaching of my concurrently filed United States patent application Ser. No. 605,994, the disclosure of which is expressly incorporated herein by reference.

Having fully described the invention, it is intended that it be limited only by the lawful scope of the appended claims.

I claim:
1. A polyurethane polymer prepared by reacting (i) a polyether having the formula:

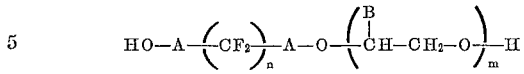

wherein A is an alkylene group, B is a fluorine-containing alkyl group, $n$ is an integer from 1 to about 10 and $m$ is an integer from 1 to about 200, with (ii) a diisocyanate having the formula:

OCN—A′—NCO wherein A′ is a divalent organic group.

2. The polyurethane of claim 1 wherein A contains from 1 to about 5 carbon atoms.
3. The polyurethane of claim 1 wherein A′ contains from 2 to about 20 carbon atoms.
4. The polyurethane of claim 1 wherein B contains from 1 to about 10 carbon atoms.
5. The polyurethane of claim 1 wherein A′ is selected from the group consisting of aromatic hydrocarbon, aliphatic hydrocarbon, halo hydrocarbon, and hetero-interrupted aromatic groups.
6. The polyurethane of claim 1 wherein an excess of diisocyanate is used to prepare the prepolymer.
7. The polyurethane of claim 1 wherein an excess of polyether is used to prepare the polymer.
8. The polyurethane of claim 1 wherein the polymer is isocyanate-terminated.
9. The polyurethane of claim 1 wherein the polymer is hydroxy-terminated.
10. The polymers of claim 8 which are advanced by reaction with an active hydrogen-containing compound.
11. The polymers of claim 9 which are advanced by reaction with an isocyanate compound.

References Cited

UNITED STATES PATENTS

| | | | |
|---|---|---|---|
| 2,911,390 | 11/1959 | Smith | 260—77.5 |
| 2,929,800 | 3/1960 | Hill | 260—77.5 |
| 3,196,132 | 7/1965 | Rosen | 260—75 |
| 3,304,334 | 2/1967 | Jones | 260—618 |
| 3,305,497 | 2/1967 | Stallings et al. | 260—2.5 |
| 3,330,872 | 7/1967 | Weesner | 260—615 |

FOREIGN PATENTS 965,220  7/1964  Great Britain.

OTHER REFERENCES

Smith: "Industrial and Engineering Chemistry," volume 49, number 8, August 1957, pp. 1241–1246 relied upon.

DONALD E. CZAJA, Primary Examiner

M. J. WELSH, Assistant Examiner

U.S. Cl. X.R.

117—161; 156—331; 260—37, 47